US 9,789,766 B2

United States Patent
Koller et al.

(10) Patent No.: US 9,789,766 B2
(45) Date of Patent: Oct. 17, 2017

(54) METHOD FOR OPERATING AN ELECTRIFIED MOTOR VEHICLE AND MEANS FOR ITS IMPLEMENTATION

(71) Applicant: Robert Bosch GmbH, Stuttgart (DE)

(72) Inventors: Oliver Dieter Koller, Weinstadt (DE); Christoph Tobias, Waldenbuch (DE); Martin Richter, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 234 days.

(21) Appl. No.: 14/771,459

(22) PCT Filed: Jan. 16, 2014

(86) PCT No.: PCT/EP2014/050837
§ 371 (c)(1),
(2) Date: Aug. 28, 2015

(87) PCT Pub. No.: WO2014/135294
PCT Pub. Date: Sep. 12, 2014

(65) Prior Publication Data
US 2016/0001657 A1    Jan. 7, 2016

(30) Foreign Application Priority Data

Mar. 4, 2013   (DE) .................. 10 2013 203 661

(51) Int. Cl.
*B60L 3/00* (2006.01)
*B60L 15/00* (2006.01)
(Continued)

(52) U.S. Cl.
CPC ............. *B60L 3/0061* (2013.01); *B60L 3/003* (2013.01); *B60L 3/0084* (2013.01); *B60L 3/12* (2013.01);
(Continued)

(58) Field of Classification Search
CPC ...... B60L 3/0061; B60L 3/003; B60L 3/0084; B60L 3/12; B60L 2240/36; B60L 2240/80
(Continued)

(56) References Cited

U.S. PATENT DOCUMENTS

2001/0029434 A1* 10/2001 Hofmann .................. H02P 9/30
                                                                   702/64

FOREIGN PATENT DOCUMENTS

CN     102783014 A    11/2012
CN     102934344 A     2/2013
(Continued)

OTHER PUBLICATIONS

Observer (Control Engeneering), Wikipedia, "http://de.wikipedia.org/w/index.php?title=Beobachter_(Regelungstechnik)&oldid=113719788", Version 11.2.2013, 9 pages.
(Continued)

*Primary Examiner* — Thomas Skibinski
(74) *Attorney, Agent, or Firm* — Norton Rose Fulbright US LLP; Gerard Messina (57) ABSTRACT

A method and arrangement for operating a motor vehicle having a vehicle electrical system having a semiconductor switch, which during the vehicle operation is loaded with load events based on at least one load-influencing factor, and for which a service life load relationship is predefined, for a nominal service life for a nominal load, and with which for at least one point in time within the nominal service life a nominal load proportion corresponding to the at least one point in time is ascertainable, and the method for the at least one point in time including ascertaining an actual load of the semiconductor switch based on establishing past load events at the at least one point in time, the ascertaining of the nominal load proportion corresponding to the at least one point in time with the predefined service life load relation-
(Continued)

ship, and comparing of the actual and nominal load proportion at the at least one point in time and the reducing of the at least one load-influencing factor when the actual load exceeds the nominal load proportion by more than a predefined tolerance value at the at least one point in time.

12 Claims, 3 Drawing Sheets

(51) Int. Cl.
    *B60L 3/12*     (2006.01)
    *B60L 7/14*     (2006.01)
    *H02H 6/00*     (2006.01)
    *H02H 3/42*     (2006.01)

(52) U.S. Cl.
    CPC ............... *B60L 7/14* (2013.01); *B60L 15/007* (2013.01); *B60L 2240/36* (2013.01); *B60L 2240/80* (2013.01); *B60L 2260/44* (2013.01); *H02H 3/42* (2013.01); *H02H 6/00* (2013.01); *Y02T 10/645* (2013.01)

(58) Field of Classification Search
    USPC .......................... 307/9.1, 10.1; 320/103–115
    See application file for complete search history.

(56) References Cited

FOREIGN PATENT DOCUMENTS

| | | |
|---|---|---|
| DE | 10 2007 035825 | 2/2009 |
| DE | 102007035825 A1 | 2/2009 |
| DE | 10 2009 045 068 | 3/2011 |
| JP | 20030009541 A | 1/2003 |
| JP | 2003 243 793 | 8/2003 |
| JP | 2005354812 A | 12/2015 |
| WO | WO 00/13304 | 3/2000 |

OTHER PUBLICATIONS

AN2008-03: Thermal equivalent circuit models, Infineon Technologies AG 2008.

\* cited by examiner

METHOD FOR OPERATING AN ELECTRIFIED MOTOR VEHICLE AND MEANS FOR ITS IMPLEMENTATION

FIELD OF THE INVENTION

The present invention relates to a method for operating an electrified motor vehicle having a vehicle electrical system, which includes at least one semiconductor switch, and to an arrangement for its implementation.

BACKGROUND INFORMATION

As a result of the increasing electrification of the drive train of modern motor vehicles, semiconductors, in particular in the form of switch elements such as transistors, are used to an increasing extent here. These are exposed to the inhospitable external conditions of the engine compartment, for example passive temperature lifts. Passive temperature lifts are created by the waste heat of the internal combustion engine heating the engine compartment while the vehicle is driving.

A particularly high load acts on the semiconductors of the converter of the electric machine in such motor vehicles, which experience additional loads from active temperature lifts due to the self-heating at high current. Large current amplitudes are typically reached during motor-related boost processes and generator-related recuperation processes (in vehicles having correspondingly operable electric machines). The semiconductors of the converter are functionally critical components since their failure results in a non-functionality of the complete electric machine.

Since the number and the amplitude of boost and recuperation processes are highly dependent on the particular application, i.e., among other things, on the driving behavior of the driver (aggressive, defensive) and/or the traffic situations in which a corresponding motor vehicle is predominantly moved (city traffic, freeway), the configuration of the semiconductors in the converter represents a technical challenge.

To avoid a premature and uncontrolled failure of semiconductors, method for estimating their residual service life may be used. With the aid of a thermal model, the junction temperature is calculated in real time, and the residual service life is determined by storing temperature lifts of the junction temperature. When a drop below a certain residual service life occurs, a preventive maintenance measure is initiated, for example.

Since operating conditions are not always predictable and a plurality of new operating modes exists in modern motor vehicles, the load from active temperature lifts at times varies drastically as a function of the particular application (see above) and the demand placed on the vehicle electrical system (so-called varying field load). This results in also drastically varying residual service lives, which may not always be reliably estimated using conventional methods or to which not always a satisfactory response is possible, even when correctly estimated.

Thus, a need exists for improved options for operating electrified motor vehicles, for example of hybrid or electric vehicles (HEV, EV), which include appropriate semiconductor switches in their vehicle electrical system, and with the aid of which a reliable operation without unexpected failures and comfort losses is made possible.

SUMMARY OF THE INVENTION

The present invention provides for a method for operating a motor vehicle having a vehicle electrical system, which includes at least one semiconductor switch, and arrangements for its implementation having the features described herein. Exemplary embodiments are the subject matter of the the following description.

An aspect of the present invention is a method which makes it possible to respond to the above-mentioned drastically varying loads and the associated, also varying failure points in time of one or multiple semiconductor switches (hereafter also referred to as semiconductors in short). For this purpose, the actual load which is applied to the semiconductor or semiconductors in the vehicle is detected. On this basis, a limiting regulation strategy for shifting the failure point in time (i.e., by reducing future loads) and/or a preventive maintenance measure may be initiated, for example, when a disproportionate load is identified.

A corresponding limiting regulation strategy may include limiting regulation measures, which within the scope of the present application shall be understood to mean measures which intervene in the operation of a corresponding vehicle, or of one or multiple semiconductors, in such a way that the loads are reduced.

To be able to implement methods for determining the residual service life of one or multiple semiconductor(s) in an electrified motor vehicle (HEV, EV), a number of boundary conditions or requirements must be met, which are briefly summarized below:

Due to the dynamics of the boost and recuperation processes (in which temporary, high currents occur), a thermal model which is used should be able to map transient processes, which may be exactly. Moreover, a calculation of the residual service life should even be possible when the temperature of the cooling medium (for example of a heat sink or a cooling liquid) is not known. A calculation should also be possible without storage of the temperature lifts since a cost-efficient implementation in the control unit requires particularly little storage space. It should furthermore be possible at an early stage to identify the presence of a disproportionate load to be able to initiate corresponding countermeasures in time, e.g., the described limiting regulation measures, and reduce the load. The nominal service life should be achievable without preventive maintenance measures, i.e., for example only by the limiting regulation measures, to avoid cumbersome stays in repair shops, and thus downtimes.

None of the methods known previously completely meets these requirements. Within the scope of the present invention, in contrast, a method is introduced which in its embodiments meets these requirements, and thus is particularly advantageous for the use in electrified motor vehicles.

The method according to the present invention is used to operate an electrified motor vehicle (e.g., HEV, EV) having a vehicle electrical system, which includes at least one semiconductor switch. As explained, a corresponding semiconductor switch is loaded with load events during the operation of the motor vehicle based on at least one load-influencing factor, e.g., a motor-related and/or generator-related power of an electric machine, which results in active temperature lifts.

According to the present invention, a service life load relationship is predefined. The service life load relationship indicates a nominal service life for a nominal load of a corresponding semiconductor switch. If the semiconductor switch is loaded continuously over the nominal service life, or on average with the nominal load, it may be assumed that it will reach the nominal service life, i.e., not fail prematurely. If the semiconductor switch is loaded continuously over the nominal service life, or on average with a lower load than the nominal load, it may be assumed that it exceeds the nominal service life, i.e., it will not fail until a fairly long time after the end of the nominal service life. In contrast, if the semiconductor switch is loaded continuously over the nominal service life, or on average with a higher load than the nominal load, it may be assumed that the semiconductor switch will possibly fail before the end of the nominal service life, i.e., it will not reach its nominal service life. It goes without saying that the nominal service life may include a safety factor, so that it may be ensured that even negative outliers do not fail before the end of the nominal service life in the event of a specimen tolerance.

The service life load relationship may be a service life characteristic curve, for example. It is also possible, at different points in time within the nominal service life, to ascertain a proportion of the nominal load (hereafter referred to as nominal load proportion) which is allowed in each case at these points in time based on the predefined service life load relationship, for example the service life characteristic curve. This is described in greater detail with reference to FIG. 2. For example, at a point in time which corresponds to 50% of the nominal service life, a corresponding proportion of the nominal load may be ascertained. In the case of a linear profile of a service life characteristic curve, the nominal load proportion is also 50% here.

According to the present invention, moreover an actual load of the at least one semiconductor switch is ascertained based on an establishment of past load events at at least one point in time. Subsequently or simultaneously, the proportion of the nominal load corresponding to the at least one point in time is ascertained with the aid of the predefined service life load relationship, for example by reading from a service life characteristic curve or by calculating with the aid of a mathematical function corresponding to the service life load relationship.

The actual load and the proportion of the nominal load at the at least one point in time (the latter, for example, from a service life characteristic curve) are compared. A reduction of the at least one load-influencing factor is carried out (e.g., in the form of the described limiting regulation measures) when the actual load exceeds the nominal load proportion by more than a predefined value at the at least one point in time.

Advantageously, at least one power loss and at least one temperature profile of the at least one semiconductor switch, and temperature lifts of the temperature profile, are determined for ascertaining the actual load of the at least one semiconductor switch, the actual load being derived from the temperature lifts with the aid of a particularly advantageous method.

In particular, the use of a service life characteristic curve based on an ascertained damage value (i.e., a value which identifies the actual load) and the nominal service life allows an early identification of disproportionate actual load, and thus the use of moderate limiting regulation measures. These do not excessively limit the driving comfort or do not affect further vehicle characteristic variables, such as fuel consumption and emission values, to an excessively high degree since they are used at an early stage.

Within the scope of the present invention, a regulation may take place to the described service life load relationship, for example a service life characteristic curve, as a function of time. This is a major advantage compared to known limiting regulation strategies which initiate a limiting regulation based on a drop below residual service lives and are thus independent of time. In other words, a drastic intervention is always carried out relatively late in the life cycle of a semiconductor in conventional methods. If the residual service life defined for the limiting regulation measure is reached long before the nominal service life, and if no maintenance measure should be carried out, tough interventions in the operating strategy of the vehicle must take place, which are noticeable to the driver.

The core of the present invention is thus the ascertainment of the actual load of the semiconductors during the vehicle operation of an electrified motor vehicle (HEV, EV) and the prevention of a failure before the nominal service life. For this purpose, the varying field load may be compensated for through the initiation of countermeasures by carrying out a limiting regulation using appropriate limiting regulation measures when the actual load is higher than was considered in the configuration. The condition identification may be carried out by an online calculation of the actual load.

In other words, an overload of a semiconductor is identified at an early stage within the scope of the present invention. It is thus made possible to prevent an uncontrolled failure (breakdown) through moderate power reduction. Compared to the related art, adjustments are advantageously carried out to enable a use during vehicle operation and to meet all the requirements mentioned at the outset (exact mapping of transient processes, calculation without knowledge of a temperature of the cooling medium and without storage of the temperature lifts, early identification of a disproportionate load, achievement of the nominal service life without preventive maintenance measures). These advantageous adjustments are specific embodiments of the present invention and are described in greater detail within the scope of the description of the figures (FIGS. 3 through 7).

Serving as an arrangement for implementing the method according to the present invention, an arithmetic unit according to the present invention, e.g., a control unit of a motor vehicle, is configured, in particular from a programming point of view, to carry out a method according to the present invention.

The implementation of the method in the form of software is also advantageous since this results in particularly low costs, in particular when an executing control unit is also used for additional tasks and is therefore present anyhow. Suitable data carriers for providing the computer program are in particular diskettes, hard drives, flash memories, EEPROMs, CD-ROMs, DVDs, and the like. It is also possible to download a program via computer networks (Internet, Intranet, and the like).

Further advantages and embodiments of the present invention are derived from the description and the accompany drawings.

It goes without saying that the above-mentioned features and those still to be described hereafter may be used not only in the particular described combination, but also in other combinations, or alone, without departing from the scope of the present invention.

The present invention is schematically shown based on one exemplary embodiment in the drawing and is described in greater detail hereafter with reference to the drawings.

DETAILED DESCRIPTION

Figure 1:
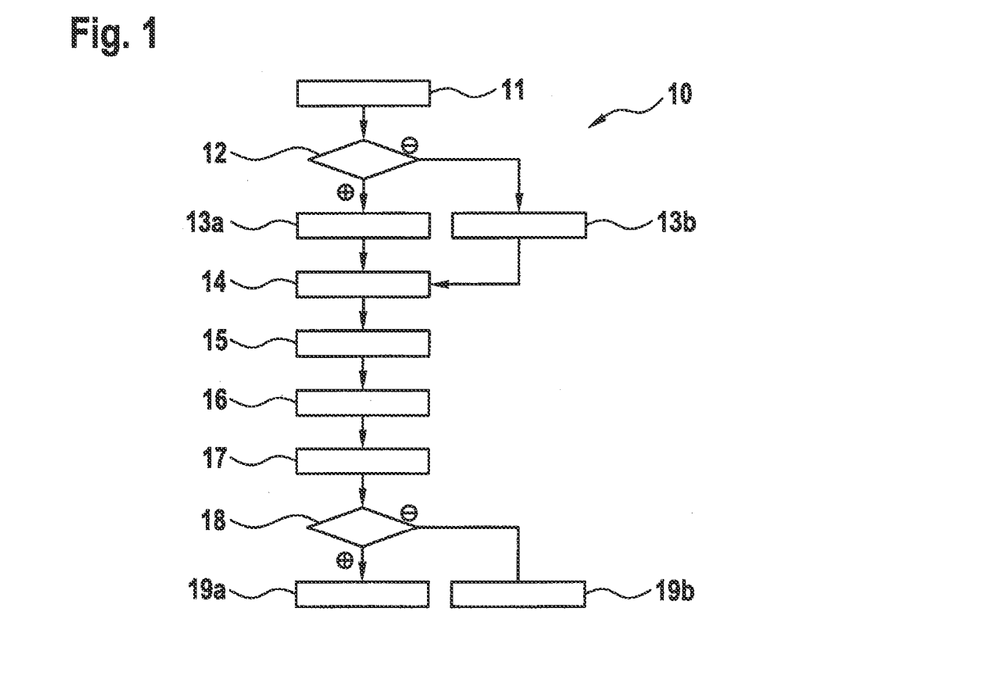
FIG. 1 shows a method according to one specific embodiment of the present invention in the form of a schematic flow chart.

FIG. 1 shows a method according to one specific embodiment of the present invention in the form of a schematic flow chart. The method is denoted overall by reference numeral 10.

The method begins in a method step 11 with the determination of a power loss. Generally all methods which are known from the related art are suitable for determining the power loss.

The method is continued in a step 12, in which it is established whether the semiconductor switch used includes a temperature sensor on its cooling medium (for example a heat sink or in a cooling water). This is known in methods 10 which are actually implemented in motor vehicles, so that this decision step 12 may be dispensed with.

If a corresponding temperature sensor is provided, it is possible with the aid of a convolution method in a step 13a, which may include, for example, the online convolution of the power loss with the heating curve, or an offline ascertainment of $R_{th}$-$C_{th}$ parameters in a parameter estimation process, to be determined. If no appropriate temperature sensor is present, in contrast, a corresponding temperature profile is determined in a step 13b with the aid of an observer model. The determined temperature profile is available in a step 14. A determination of temperature lifts takes place in a step 15 from the temperature profile, for example using a known counting method, which was suitably adapted for step 15. This may be, for example, an online-adapted 4-point rain flow method.

In a step 16, a damage parameter or an actual load of the semiconductor switch is ascertained from the ascertained temperature lifts. In a step 17, the actual load is compared to the described service life load relationship, for example a service life characteristic curve.

In a step 18, it is established whether, based on the comparison, the actual load exceeds the nominal load proportion from the service life load relationship by more than a predefined tolerance value. If this is the case, an operating strategy is adapted in a step 19a, namely in the form of a reduction of the at least one load-influencing factor or in the form of the described limiting regulation measures. However, if the actual load does not exceed the nominal load proportion, which is derived from the known service life load relationship at the at least one point in time, or does not exceed it by more than the predefined tolerance value, the existing operating strategy is maintained (step 19b). Method 10 is advantageously repeated several times during the operation of the motor vehicle.

Figure 2:
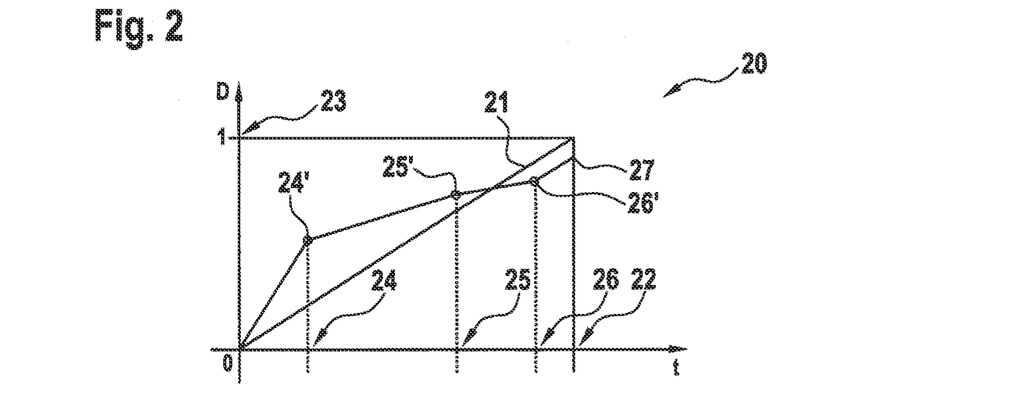
FIG. 2 illustrates a method according to one specific embodiment of the present invention in the form of a service life diagram.

The method according to the present invention is further illustrated in FIG. 2 based on a service life diagram 20. A time t is plotted on an x-axis of service life diagram 20, and a load D is plotted on a y-axis. A load characteristic curve 21 is illustrated in service life diagram 20 which, as was described several times, indicates a service life load relationship between a nominal service life, denoted here by 22, and a nominal load, denoted here by 23. At the nominal service life 22, the maximally permissible or established load of a corresponding semiconductor switch is reached. In the illustrated example of FIG. 2, load characteristic curve 21 delineates a linear profile between the maximum service life (nominal service life 22) and the maximum load (nominal load 23) and particular zero point 0. However, load characteristic curves may also be indicated, for example, in the form of other mathematically describable functions.

Service life diagram 20 shows three different points in time 24, 25, and 26. An actual load curve is denoted by 27.

At point in time 24, it may be established by ascertaining an actual load, for example, that the corresponding load value, denoted here by 24', is above load characteristic curve 21. If the operation of the motor vehicle or the semiconductor switch of a corresponding motor vehicle were to continue at a corresponding load, it would have to be expected that the actual service life of the semiconductor switch will not reach the nominal service life 22. For this reason, the limiting regulation measures which have already been described several times are initiated.

If subsequently, at a second point in time 25, an actual load of the semiconductor switch is again determined—a corresponding point is denoted here by 25'—it may be established that this point is now approaching the service life characteristic curve more closely. However, at point in time 25, the operating strategy is not changed in the form of a further limiting regulation, since at further load with the corresponding load-influencing factors, which resulted in the progression between points 24' and 25', a sufficient service life, i.e., achieving the nominal service life, would become possible.

In the illustrated example, a corresponding vehicle is operated by a first driver from point in time 0 until point in time 25. This driver stresses the semiconductor switch in a disproportionately high manner. At point in time 25, a driver change takes place. The second driver now operating the vehicle loads the semiconductor switch in a below average manner. As a result, a drop below service life characteristic curve 21 occurs at a point in time 26', without the operating strategy having been modified further. Due to this drop below the characteristic curve, the limiting regulation of the load-influencing factors previously carried out may be suspended again.

As was mentioned at the outset, adjustments are introduced in specific embodiments of the present invention which enable a particularly advantageous use during the vehicle operation and meet all the requirements mentioned at the outset (exact mapping of transient processes, calculation without knowledge of a temperature of the cooling medium and without storage of the temperature lifts, early identification of a disproportionate load, achievement of the nominal service life without preventive maintenance measures). These are described hereafter.

The exact mapping of transient processes is, as described at the outset, particularly advantageous for use during vehicle operation.

In particular, recuperation and boost processes, i.e., load-influencing factors, take place only in short time segments in relation to the operating time. A thermally steady state is therefore rarely reached. To nonetheless be able to ensure an exact calculation, the thermal capacities must also be exactly emulated, in addition to the thermal resistances. For this purpose, for example, a Cauer model or a Foster model (see, for example, AN2008-03: Thermal equivalent circuit models, Infineon Technologies AG 2008, FIGS. 1 and 2) may be used. In this way, excessively large errors in the calculation of the junction temperature may be avoided. Larger errors in the determination of the spent service life (i.e., the actual load) may also be reduced by the non-linearity of the damage model (slope in the Wöhler curve in the range of k=5).

It has been found that a pure $R_{th}$ model, for example in the comparison to the (physically correct) thermal Cauer model, considerably overestimates the temperature lifts. This may be attributed to the fact that the first neglects that the thermal masses only heat slowly. Consequently, limiting regulation measures would have to be initiated at an unnecessarily early stage, if necessary.

For the same reason, advantageously the convolution method is used to ascertain the thermal model, since contrary to a thermal model based on heat spreading, the convolution model takes a three-dimensional heat emission in the space into consideration. Heat spreading is based on a one-dimensional heat path from the chip of the semiconductor switch to its heat sink, and thus calculates the junction temperature too conservatively.

A power loss curve is used for the convolution. A temperature delta between the junction and cooling medium is ascertained using the thus ascertained $Z_{th}$ functions. If the temperature of the cooling medium is known, the junction temperature may thus be determined.

Considering the thermal impedance from a system theory point of view, this represents a transmission function between an input signal and an output signal. The input signal is the power loss here, the output signal is the resulting temperature signal:

$$Z_{th}(p) = \frac{Y(p)}{X(p)} = \frac{L\{\Delta\vartheta(t)\}}{L\{P_v\}}$$

$Z_{th}(t)$ thus represents the system response to a Dirac delta function. Mathematically, this is equivalent to the derivative of the step response. It is possible to show that the resulting temperature profile may be calculated as follows:

$$T(t) = T_0 + \int_0^t \dot{A}(t-\tau)P(\tau)d\tau$$

$T_0$ represents the coolant temperature and $A(t)$ the step response. The step response may be ascertained with sufficient accuracy experimentally or with the aid of an FEM simulation (as is advantageously provided within the scope of the present invention).

To ascertain the temperature profile, the resulting temperature profile is shifted by the temperature of the cooling medium. If multiple chips are present on one module, the superposition of the thermal sources must also be taken into consideration. For this purpose, the temperatures, which are induced by N heat sources in the form of chips, are added up. Temperature $T_0$ of the cooling medium is identical for all modules:

$$Ti(t) = T_0 + \sum_{i=1}^{N} \int_0^t \dot{A}_{ij}(t-\tau)P(\tau)d\tau$$

Represented in matrix form, this corresponds to (for m examined temperature locations and heat sources):

$$\begin{bmatrix} \Delta T_1 \\ \Delta T_2 \\ \Delta T_m \end{bmatrix} = \begin{bmatrix} \dot{A}11 & \dot{A}12 & \dot{A}1N \\ \dot{A}21 & \dot{A}22 & \dot{A}2N \\ \dot{A}M1 & \dot{A}M2 & \dot{A}MM \end{bmatrix} * \begin{bmatrix} P_1 \\ P_2 \\ P_n \end{bmatrix}$$

Figure 3:
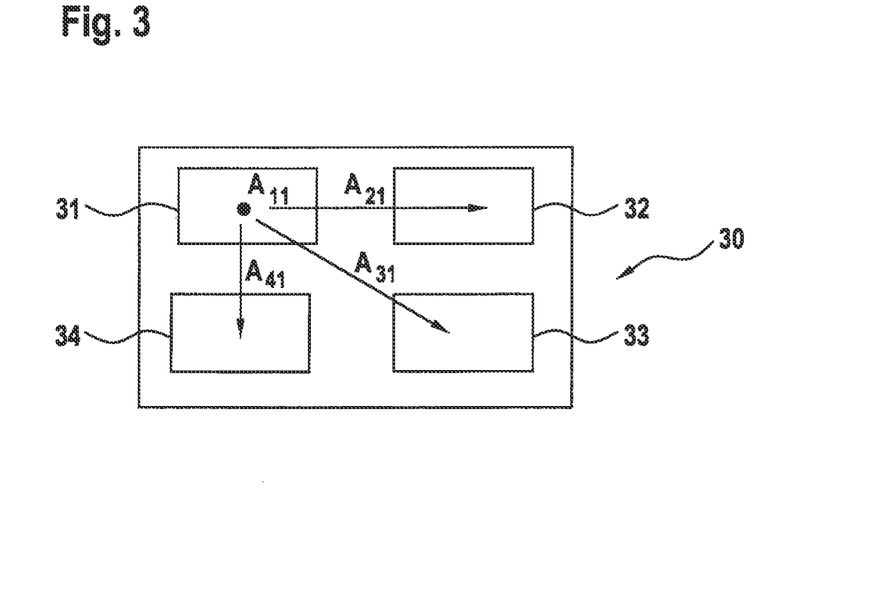
FIG. 3 shows the significance of the matrix coefficients.

FIG. 3 shows the significance of the matrix coefficients. A semiconductor module 30 is shown, which carries four semiconductors 31 through 34.

$A_{11}$ describes the temperature step response at the site of the power input (semiconductor 31 here), while $A_{21}$ describes how semiconductor 32 is heated by a power leap on semiconductor 31. The same applies to $A_{31}$ and $A_{41}$. In this way, both three-dimensional heat propagation and the interaction between the semiconductors of a power module are described.

If the convolution in the control unit requires too much computing time, it is possible in one alternative specific embodiment to approximate the heating curve using a parameter estimation method, and a thermal equivalent circuit model in the form of a Cauer or Foster model may be derived.

As described at the outset, the calculation without a known coolant temperature (heat sink or cooling water) for use in the vehicle operation is also particularly advantageous.

Figure 4:
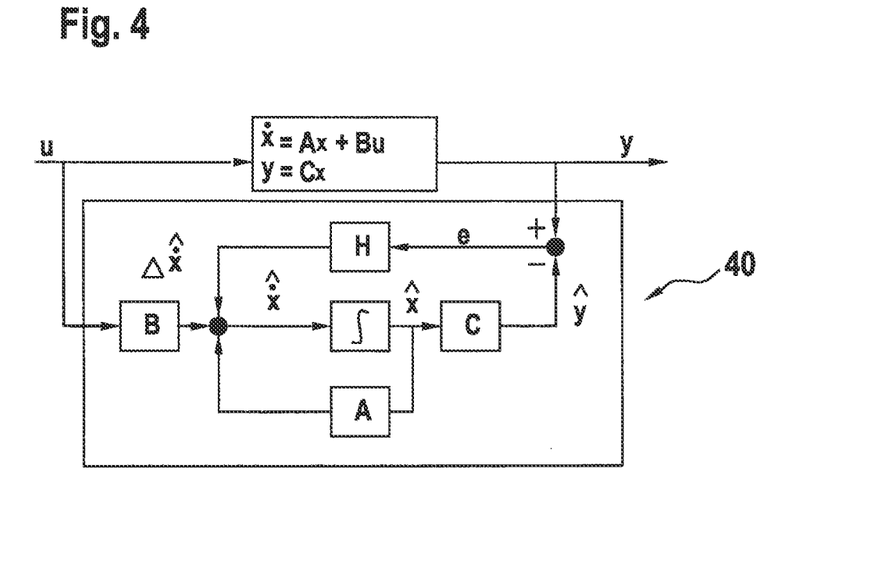
FIG. 4 shows, if the coolant temperature is unknown, a so-called observer may be used.

If the coolant temperature is unknown, a so-called observer may be used, which is schematically shown in FIG. 4 and is denoted overall by reference numeral 40. The parameter estimation method used for this purpose is also based on the convolution method. In this method, the matrices of the observer are ascertained offline in an FEM Model. For this, the order of the observer must be sufficiently high to be able to emulate the heating curves in the model with sufficient precision. Observers are used when inner state variables are not directly measurable, but relevant. Via a system of differential equations (model), the inner states are reconstructed from the dynamic relationships of input and output variables. The derived model is simulated in parallel to the real system in software. In the case of a perfect model, the reconstructed (observed, here e.g., sensor temperatures) states agree exactly with the real states.

However, since this is not the case in practice, the reconstructed measuring variables are compared to the measured ones and, analogously to a standard concept, fed back into the observer system. In the present case, the calculated power losses are provided as input variables, and the measured temperatures of the sensors in the semiconductor module are provided as output variables. However, the semiconductor temperatures are of decisive importance for the limiting regulation, which are modeled as inner state variables and are thus reconstructed in the observer system. It should be noted that the created model meets the regulation-related criterion of observability. Via the deviation between simulated and measured sensor values, it is possible to estimate the coolant temperature and to identify disturbances in the cooling medium. As described at the outset, the calculation without storage of the temperature lifts for use in the vehicle operation is also particularly advantageous.

Figure 5:
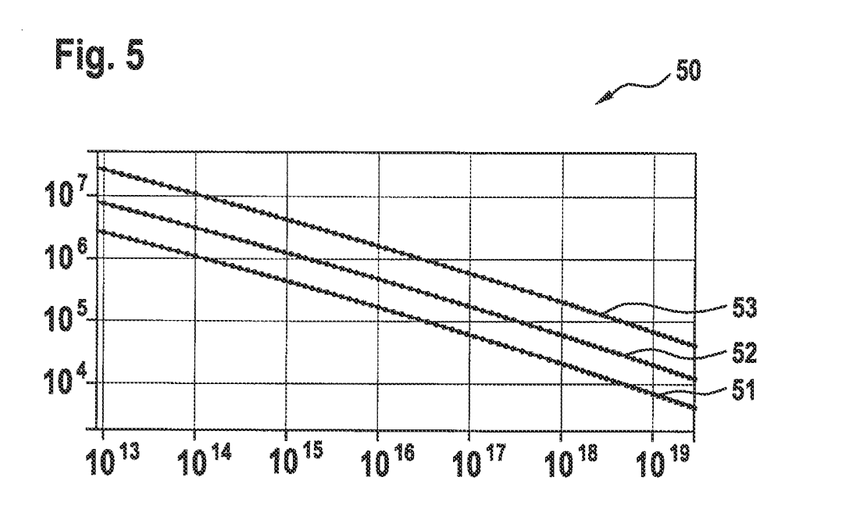
FIG. 5 shows, in service life experiments, Woehler curves which are ascertained based on temperature lifts and average temperatures for this purpose.

In service life experiments, Wöhler curves 51 through 53 are ascertained based on temperature lifts and average temperatures for this purpose, as is schematically shown in FIG. 5 and denoted by reference numeral 50. Each temperature lift corresponds to a stress-strain hysteresis in the material layer, which is created as a result of the thermal mismatch of the materials used in packaging. The amount of the temperature lift thus corresponds to an energy that is impressed in packaging, and the average temperature of the lift corresponds to the mean stress.

To be able to evaluate the stochastic temperature signal with respect to the spent service life (i.e., an actual load) and use the linear damage accumulation, the signal must be broken down into individual lifts. Each lift corresponds to a stress-strain hysteresis, and thus to an introduced energy. As a result, the condition for use of the linear damage accumulation is met, which is based on the assumption that each component has a tolerable tensile energy absorption which may be impressed until complete failure. Up to the boundary condition of strain, when the absorbed energy corresponds to the absorbable energy and thus a damage value, which is denoted here by D, assumes a value of 1, the partial energies are added up.

A complete hysteresis is only created when the stress, and thus the temperature, again assumes the initial amount. For this reason, the rain flow counting method (the related art, as in endurance strength) is advantageously used to determine the service life of semiconductors in the classification of temperature lifts, the method only counting complete lifts. In this way, rain flow methods known from material science may be used to count stress-strain hystereses for counting temperature lifts.

For the use presented within the scope of the present application, two main requirements are made in regard to the rain flow count and to the subsequent damage calculation. Since (1) a complete storage of the temperature lifts in a rain flow matrix over the entire service life in the control unit would result in high costs, the method used should dispense with a storage of these data. Moreover (2) the present application includes a regulating intervention into load-influencing factors, for example into the system of the converter. The control variable is instantaneous damage value D here, which must be provided within the meaning of a regulation during the operation, i.e., online.

The so-called online damage calculation is suitable for meeting these requirements. This method developed for mechanical stresses may also be used for the direct counting of temperature lifts due to the above-described analogy to the temperature lifts. The method is described in general hereafter.

The basic idea of the method is a rain flow count of the dynamic stress during the system operation with the aid of an online-capable 4-point algorithm. Complete stress hystereses detected in the process may be directly converted into a damage contribution with the aid of a Wöhler curve. This contribution is added to the total damage present up until then. In this way, it is possible to determine a damage value online with little storage requirement and to use it further.

Figure 6:
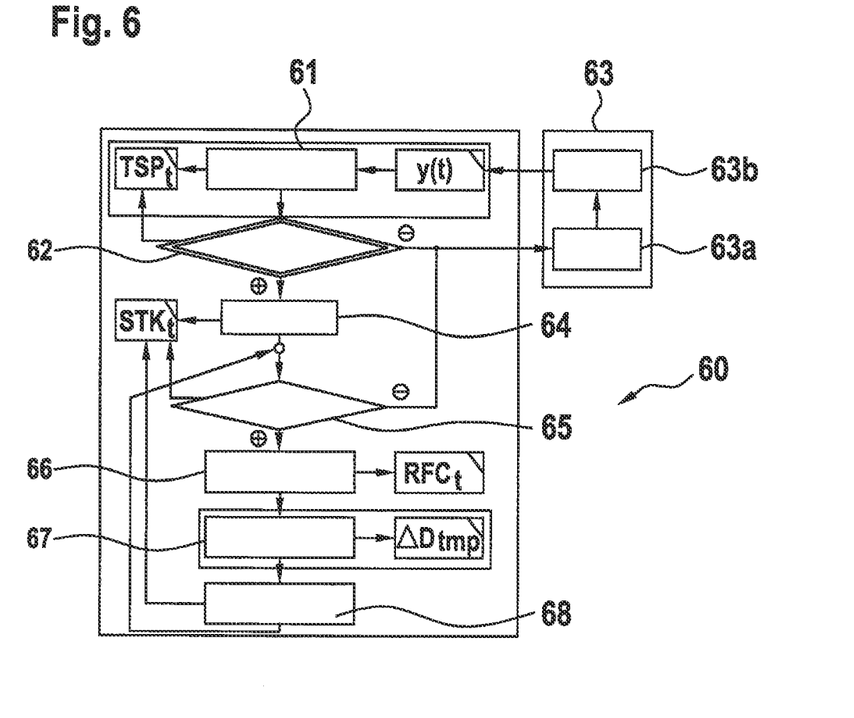
FIG. 6 shows the method used for the online damage calculation.

The method used for the online damage calculation is outlined in FIG. 6 and denoted overall by reference numeral 60. This approach corresponds partially to the related art in the endurance strength. For the reasons described above, it may be adapted for the counting of temperature lifts. The adaptations usable according to the present invention are illustrated.

In a step 61, signal values are updated. In a step 62, a check for a reversal point is made on this basis. If no such reversal point is detected, the junction temperature simulation is continued in step 63, and a temperature value is provided 63*b*. If a reversal point is detected in step 62, the method progresses with a step 64, in which a stack is updated.

A check for a stress cycle takes place in a next step 65. If this check is positive, step 66 is carried out; if not, the method is continued as above with step 63.

In steps 66 through 68, the stress cycle is stored and then a damage calculation is carried out. At the end, the stress cycle is deleted from the stack, and the stack is enabled for a new cycle.

In particular step 67 represents an advantageous extension over known methods which are suited for use in the motor vehicle.

The online damage calculation operates based on a stress signal y(t). In the present case, the observed temperature profile is used for this purpose; y(t)=T(t) applies. The instantaneously observed temperature profile is read in and stored together with the two previously observed signal values in a set $TSP_t$ (TSP=three signal points) (see step 61). The content of set $TSP_t$ varies with time.

A sign comparison may be used to check whether the mean value in $TSP_t$ was a reversal point in the signal. If a reversal point is detected in the signal (see step 62), this value may be added to the stack $STK_t$ of the method (see step 64). The updated stack $STK_t$ may be examined for complete stress cycles with the aid of known methods (see step 65). This results in a temporary matrix of the rain flow cycles $RFC_{tmp}$ and a temporary residual $RES_{tmp}$. If new stress cycles result from the instantaneous observation, $RFC_{tmp} \neq \{\ \}$ applies. The actual matrix of the rain flow cycles $RFC_t$ and the stack $STK_t$ may be updated in this case (see step 66). A damage contribution $\Delta D_{tmp}(t)$ may then be directly calculated from a comparison with the Wöhler curve for the added stress cycles in $RFC_{tmp}$ (step 67). This temporary damage may be added to the instantaneously present total damage D(t). A procedure is thus shown which may efficiently assign a damage value D(t) to a signal y(t). The damage value D(t) is always a step-shaped, monotonically increasing function. The value of the function characterizes the total damage which occurred up until then, i.e., the actual load.

The storage of the matrix of the rain flow cycles $RFC_t$ may optionally also be dispensed with. The online damage calculation was able to be verified with the aid of conventional methods and programs for the rain flow count and for the damage calculation.

Contrary to the known methods, within the scope of the present invention a measure is advantageously initiated at an early stage when a disproportionate damage is identified, instead of after a drop below a residual service life occurs. In this way, the permissible residual service life is a function of the existing or remaining operating time. The sooner a disproportionate damage is identified, the less severely does the generator-based and/or motor-based power of the HEV/EV need to be limited, for example, to still achieve the required nominal service life.

The actual curve of a damage value D may be ascertained via the online damage calculation. As soon as a temperature lift is identified in the stack of stored extreme values, the damage proportion of this lift is added to this. It is thus a continuously ascertained actual load.

This actual curve may be compared to a service life characteristic curve, so that a corresponding trajectory of the individual driver may be identified. Tolerance lines may be used for this purpose, which increasingly approach each other toward the end of the required service life, since the available time for taking countermeasures is being reduced. A corresponding tolerance value may thus be predefined based on a timing of the at least one point in time of the determination of the actual load within the nominal service life. If the load applied by the driver on the component is greater than that considered in the configuration, the trajectory is above the setpoint characteristic curve. Otherwise, it is below the same. If the trajectory leaves the tolerance boundaries, countermeasures must be initiated.

In HEV/EV applications, this results in the option of achieving the nominal service life via the influence of the operating strategy on the service life of the semiconductors, even without a preventive maintenance measure. For this purpose, a different operating strategy is set in extreme cases. The service life characteristic curve may be regulated with the aid of the change in the operating strategy. The more operating strategies are available, the finer the resolution of the regulation may be. In the extreme case, a continuous regulation may take place to a corresponding service life characteristic curve, e.g., with the aid of the recuperation power.

What is claimed is:

1. A method for operating a motor vehicle having a vehicle electrical system, the method comprising:
    ascertaining an actual load of at least one semiconductor switch based on an establishment of past load events at at least one point in time, wherein the vehicle electrical system includes the at least one semiconductor switch, which during the operation of the motor vehicle is loaded with load events based on at least one load-influencing factor, and for which a service life load relationship is predefined, which indicates a nominal service life for a nominal load, and with which for the at least one point in time within the nominal service life a nominal load proportion corresponding to the at least one point in time is ascertainable;
    ascertaining the nominal load proportion corresponding to the at least one point in time with the predefined service life load relationship; and
    comparing the actual load and the nominal load proportion at the at least one point in time, and reducing the at least one load-influencing factor when the actual load exceeds the nominal load proportion at the at least one point in time by more than a predefined tolerance value, the tolerance value being predefined based on a timing of the at least one point in time within the nominal service life.

2. The method of claim 1, wherein at least one power loss and at least one temperature profile of the at least one semiconductor switch, and temperature lifts of the temperature profile, are determined for ascertaining the actual load, the actual load being derived from the determined temperature lifts.

3. The method of claim 2, wherein at least one value of a temperature sensor in or on a cooling medium of the at least one semiconductor switch is used to determine the temperature profile of the at least one semiconductor switch.

4. The method of claim 3, wherein the temperature profile of the at least one semiconductor switch is ascertained from the at least one value of the temperature sensor with the aid of a convolution method and/or a thermal model.

5. The method of claim 2, wherein at least one observer model is used to determine the temperature profile of the at least one semiconductor switch.

6. The method of claim 2, wherein an online rain flow method is used to determine the temperature lifts of the temperature profile.

7. The method of claim 1, which is carried out at at least one first point in time and at a second point in time, in which, when the at least one load-influencing factor is reduced at the first point in time because the actual load exceeds the nominal load proportion at the first point in time by more than the predefined tolerance value at the first point in time, the at least one load-influencing factor is increased at the second point in time when the actual load does not exceed the nominal load proportion at the second point in time by more than the predefined tolerance value at the second point in time.

8. The method of claim 7, wherein the at least one load-influencing factor includes a generator-related and/or motor-related power of an electric machine in the vehicle electrical system having the at least one semiconductor switch.

9. The method of claim 7, wherein the service life load relationship is predefined in the form of a load characteristic curve.

10. An arithmetic unit for operating a motor vehicle having a vehicle electrical system, comprising:
    an ascertaining arrangement to ascertain an actual load of at least one semiconductor switch based on an establishment of past load events at at least one point in time, wherein the vehicle electrical system includes the at least one semiconductor switch, which during the operation of the motor vehicle is loaded with load events based on at least one load-influencing factor, and for which a service life load relationship is predefined, which indicates a nominal service life for a nominal load, and with which for the at least one point in time within the nominal service life a nominal load proportion corresponding to the at least one point in time is ascertainable;
    another ascertaining arrangement ascertain to the nominal load proportion corresponding to the at least one point in time with the predefined service life load relationship; and
    a comparing arrangement to compare the actual load and the nominal load proportion at the at least one point in time, and reducing the at least one load-influencing factor when the actual load exceeds the nominal load proportion at the at least one point in time by more than a predefined tolerance value, the tolerance value being predefined based on a timing of the at least one point in time within the nominal service life.

11. The arithmetic unit of claim 10, wherein at least one power loss and at least one temperature profile of the at least one semiconductor switch, and temperature lifts of the temperature profile, are determined for ascertaining the actual load, the actual load being derived from the determined temperature lifts.

12. A machine-readable storage medium having a computer program, which is executable by a processor, comprising:
    a program code arrangement having program code for operating a motor vehicle having a vehicle electrical system, by performing the following:
        ascertaining an actual load of at least one semiconductor switch based on an establishment of past load events at at least one point in time, wherein the vehicle electrical system includes the at least one semiconductor switch, which during the operation of the motor vehicle is loaded with load events based on at least one load-influencing factor, and for which a service life load relationship is predefined, which indicates a nominal service life for a nominal load, and with which for the at least one point in time within the nominal service life a nominal load proportion corresponding to the at least one point in time is ascertainable;
        ascertaining the nominal load proportion corresponding to the at least one point in time with the predefined service life load relationship; and
        comparing the actual load and the nominal load proportion at the at least one point in time, and reducing the at least one load-influencing factor when the actual load exceeds the nominal load proportion at the at least one point in time by more than a predefined tolerance value, the tolerance value being predefined based on a timing of the at least one point in time within the nominal service life.

* * * * *